Patented Nov. 15, 1927.

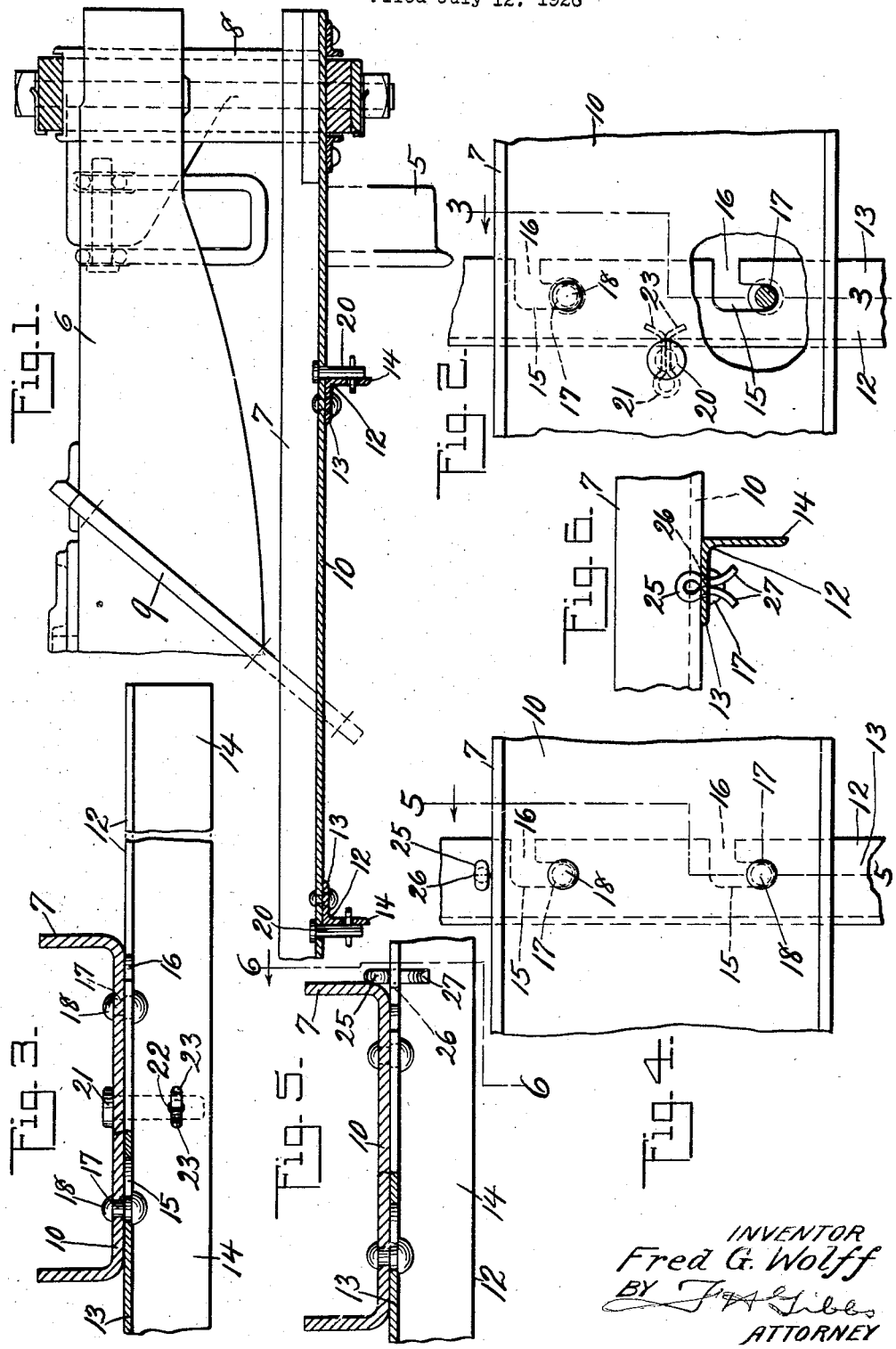

1,649,434

UNITED STATES PATENT OFFICE.

FRED G. WOLFF, OF NEW YORK, N. Y., ASSIGNOR TO AMERICAN CAR AND FOUNDRY COMPANY, OF NEW YORK, N. Y., A CORPORATION OF NEW JERSEY.

BRAKE-BEAM SUPPORT.

Application filed July 12, 1926. Serial No. 121,922.

In the drawings:

Fig. 1 is a fragmentary view of parts of a truck frame as seen with the truck "end on," the "spring plank" shown being in longitudinal section, and the supports in cross-section;

Fig. 2 is a fragmentary plan view of the spring plank and one of the supports;

Fig. 3 shows a cross-section through the spring plank at one of the supports, which also appears partly in longitudinal section, the section being taken as indicated by the line 3—3 in Fig. 2, and the support being shown partly broken away;

Fig. 4 is a plan view similar to Fig. 2, but showing a somewhat different means of securing the support against disengagement from the spring plank;

Fig. 5 is a view similar to Fig. 3, but showing the same construction as Fig. 4;

Fig. 6 is a fragmentary edge view of the spring plank with the support in cross-section as indicated by the line 6—6 in Fig. 5.

My invention relates to brake beam supports and their mounting, and particularly emergency or safety supports (as they are termed), for preventing brake beams which may get loose from falling to the railway track and causing accidents. I aim to provide a secure, rugged, simple, and inexpensive mounting for such supports.

The parts of the truck shown in the drawings include the car wheel 5, the truck bolster 6, the spring plank 7, the bolster column 8, and the brake lever 9. In the present instance, the spring plank 7 is of channel construction, with horizontal web 10 and upstanding flanges. The safety or emergency brake beam supports 12, 12 carried by the spring plank 7 project to either side thereof, in position to sustain the brake beam (not shown) in case of accident to the brake rigging (not shown). Each of these supports 12, 12 may consist of an angle bar with one flange 13 flat against the lower side of the spring plank 7, and the other flange 14 turned downward. For the purpose of mounting each of the supports 12, 12 on the spring plank 7, one of the parts is provided with a headed projection at its side adjacent the other, and the latter is provided with a corresponding opening in its edge, adapted to receive the shank of the projection, but too narrow to pass its head. Means are provided for preventing withdrawal of the projection from the opening.

As shown in Fig. 2, the opening above mentioned is in the form of a longitudinal slot 15 in the horizontal flange of the support 12, with a lateral mouth 16 through the edge of the flange for entrance and exit of the projection to and from the slot 15. As best shown in Figs. 2 and 3, the projection is part of a stud 17 whose upper portion is reduced to fit a corresponding hole in the web 10, and whose upper end is headed over at 18 to fasten the stud securely in the web 10. The larger portion of the stud 17, which forms the downward projecting shank above described, is of a size to fit the opening 15, 16 somewhat loosely, and has its lower end headed to a still larger size so as to be incapable of pulling up through the opening. As shown in Figs. 2 and 3, duplicate openings 15, 16 and studs 17, 17 are provided for each of the supports 12, 12. Withdrawal of the studs 17, 17 from the openings 15, 16, 15, 16 may be prevented, amongst other ways, either by preventing displacement of the member 12 sidewise relative to the projections when the latter are in the slots 15, 15, or by preventing movement of said member 12 lengthwise of the slots 15, 15 when the studs 17, 17 are at the inner extremities of the slots 15, 15. The securing means shown in Figs. 1, 2, and 3 does both.

As shown in Figs. 1, 2, and 3, the securing means consists of a headed pin 20 inserted through a hole in the plank web 10 behind the vertical flange 14 of the member 12, about midway between the studs 17, 17. The presence of this pin 20, it will be seen, makes it impossible to shift the member 12 sidewise so as to withdraw the studs 17, 17 through the openings 16, 16, even if said openings 16, 16 be first brought in line with the studs by movement of the member 12 lengthwise of the slots 15, 15. In addition, there is shown a cotter pin 21 inserted through a diametral hole in the shank of the pin 20 and a corresponding hole 22 in the flange 14, with its ends 23, 23 spread apart to prevent its withdrawal. The position of the hole 22 is such as to fall opposite the hole in the pin 21 only when the studs 17, 17 are at the inner ends of the slots 15, 15, as shown in Figs. 2 and 3. The presence of the cotter pin 21 makes it impossible to displace the support 12 lengthwise substantially, so as to bring the openings 16, 16 opposite the studs 17, 17.

The construction illustrated in Figs. 4–6 differs from that of Figs. 1–3 merely as regards the securing means for preventing withdrawal of the studs 17, 17 from the openings 15, 16, 15, 16. As here shown, the securing means employed consists of a cotter pin key 25 inserted through a hole 26 in the horizontal flange 13 of the member 12, with its ends 27, 27 spread apart below the flange. The hole 26 is so located as to be exposed for insertion of the key 25 only when the studs 17, 17 are at the inner end of the slots 15, 15, as shown in Fig. 4; and when the key 25 is in place, it engages the edge of the spring plank 7 and altogether prevents movement of the member 12 lengthwise of the slots 15, 15 such as would be necessary to bring the studs 17, 17 in line with the openings 16, 16.

In Figs. 4 to 6, various parts and features are marked with the same reference characters as in Figs. 1–3, as a means of dispensing with merely repetitive description.

What is claimed is:

1. The combination of a truck member and a brake beam support member, one of them having a headed projection at its side adjacent the other, and said other having in its edge an opening adapted to receive the shank of said projection, and removable fastenings engaging both the truck member and brake beam support member to prevent withdrawal of the projection from the opening.

2. The combination of a truck member and a brake beam support member, one of them having a headed projection at its side adjacent the other, and said other having in its edge an opening adapted to receive the shank of said projection, with means for preventing withdrawal of the projection from said opening.

3. In combination a spring plank of a car truck, rows of alined studs projecting from one face thereof, a plurality of brake beam supports extending transversely of the spring plank and each having bayonet slots interlocking with the studs, and removable fastenings engaging the spring plank and brake beam supports to retain the latter in a position where the studs cannot pass from the bayonet slots.

4. The combination of a truck member and a brake beam support member, one of them having a headed projection at its side adjacent the other, and said other having a longitudinal slot with a lateral entrance opening through the edge of said member, with means for preventing relative movement of said members lengthwise of the slot when the projection is engaged therein.

5. The combination of a truck member and a detachable brake beam support member, one of them having riveted therein a stud with a headed shank projecting at the side of the member adjacent the other member, and said other member having an opening adapted to receive the stud shank by sidewise movement relative thereto, but too narrow for the stud head.

6. The combination of a truck member and a brake beam support member, one of them having riveted therein a stud with a headed shank projecting at the side of the member adjacent the other member, and said other member having an opening adapted to receive the stud shank but too narrow for its head, with means for preventing disengagement of said stud from said opening.

7. The combination of a truck part with a stud riveted therein and having a headed shank projecting at the lower side of said part, and a brake beam support having a longitudinal slot with a lateral entrance opening through the support edge, with means for preventing longitudinal movement of said support when said stud is engaged in said slot.

In witness whereof I have hereunto set my hand.

FRED G. WOLFF.